United States Patent
Plat et al.

(10) Patent No.: US 11,121,976 B2
(45) Date of Patent: Sep. 14, 2021

(54) SYSTEM, DEVICE, AND METHOD FOR PROVIDING DISTRIBUTED QUALITY-OF-SERVICE CONTROL AND POLICY ENFORCEMENT

(71) Applicant: Allot Communications Ltd., Hod-Hasharon (IL)

(72) Inventors: Lior Plat, Tel Aviv (IL); Idan Bariach, Ramat Gan (IL); Michal Rapaport, Tel Aviv (IL); Liran Sinay, Petah Tikva (IL); Itai Weissman, Kiryat Ono (IL); Boris Lifshitz, Kokhav Yair (IL)

(73) Assignee: ALLOT LTD., Hod Hasharon (IL)

( * ) Notice: Subject to any disclaimer, the term of this patent is extended or adjusted under 35 U.S.C. 154(b) by 97 days.

(21) Appl. No.: 16/676,487

(22) Filed: Nov. 7, 2019

(65) Prior Publication Data
US 2021/0144096 A1    May 13, 2021

(51) Int. Cl.
*H04L 12/813* (2013.01)
*H04L 12/851* (2013.01)
(Continued)

(52) U.S. Cl.
CPC .......... *H04L 47/20* (2013.01); *H04L 43/0894* (2013.01); *H04L 47/2416* (2013.01);
(Continued)

(58) Field of Classification Search
CPC . H04L 47/20; H04L 47/2416; H04L 47/2441; H04L 47/2458; H04L 47/6255; H04L 43/0894
See application file for complete search history.

(56) References Cited

U.S. PATENT DOCUMENTS 6,795,441 B1 *   9/2004   Widmer .............. H04L 47/2441
                                                     370/395.4
9,680,756 B2 *   6/2017   Keith .................. H04L 47/2441
(Continued)

OTHER PUBLICATIONS

D. Zagar, "Formal specification of QoS parameters by hierarchical tree structure", Sep. 15-18, 2002, 9th International Conference on Electronics, Circuits and Systems, 10.1109/ICECS.2002.1046437, pp. 1-4 (Year: 2002).*

(Continued)

*Primary Examiner* — Paul H Masur
(74) *Attorney, Agent, or Firm* — Eitan Mahulal Sadot

(57) ABSTRACT

System, device, and method for providing distributed quality-of-service control and policy enforcement. A tree hierarchy representation is constructed for distributed enforcement of a Quality-of-Service (QoS) policy on incoming packets that are intended for transmission towards a destination, by at least two separate Processing Units (PUs) that separately process different packets that are intended for transmission towards that destination. A cross-PU Instances Synchronization Unit automatically determines that a first PU caused modification of a first set of instances of parent-child Policy Objects that are utilized by the first PU, and dynamically causes a corresponding modification to a second set of instances of parent-child Policy Objects that are utilized by a second PU. The QoS policy is enforced, on a packet-by-packet basis, by different member entities of the tree hierarchy representation, to achieve the overall QoS policy.

3 Claims, 5 Drawing Sheets

(51) Int. Cl.
  *H04L 12/863*  (2013.01)
  *H04L 12/853*  (2013.01)
  *H04L 12/26*   (2006.01)
  *H04L 12/833*  (2013.01)

(52) U.S. Cl.
  CPC ...... *H04L 47/2441* (2013.01); *H04L 47/2458* (2013.01); *H04L 47/6255* (2013.01)

(56) References Cited

U.S. PATENT DOCUMENTS

| | | | |
|---|---|---|---|
| 2002/0073226 A1* | 6/2002 | Sridhar | H04L 47/125 709/235 |
| 2002/0122422 A1 | 9/2002 | Kenney | |
| 2008/0208645 A1 | 8/2008 | Molloy | |
| 2012/0143876 A1* | 6/2012 | Srinivasan | G06Q 10/06 707/747 |

OTHER PUBLICATIONS

European Search Report in European patent application EP 20204629.8, dated Mar. 31, 2021.

\* cited by examiner

SYSTEM, DEVICE, AND METHOD FOR PROVIDING DISTRIBUTED QUALITY-OF-SERVICE CONTROL AND POLICY ENFORCEMENT

FIELD

The present invention relates to the field of communication systems.

BACKGROUND

Electronic devices and computing devices are utilized on a daily basis by millions of users worldwide. For example, laptop computers, desktop computers, smartphone, tablets, and other electronic devices are utilized for browsing the Internet, consuming digital content, streaming audio and video, sending and receiving electronic mail (email) messages, Instant Messaging (IM), video conferences, playing games, or the like.

Many electronic devices communicate with each other, or with remote servers or remote entities, via one or more wireless communication links or networks; for example, using Wi-Fi, using cellular communications, over the Internet, or the like.

SUMMARY

Some embodiments of the present invention may provide systems, devices, and methods for providing distributed Quality-of-Service (QoS) control and policy enforcement. For example, a tree hierarchy representation is constructed for distributed enforcement of a Quality-of-Service (QoS) policy on incoming packets that are intended for transmission towards a destination, by at least two separate Processing Units (PUs) that separately process different packets that are intended for transmission towards that destination. A cross-PU Instances Synchronization Unit automatically determines that a first PU caused modification of a first set of instances of parent-child Policy Objects that are utilized by the first PU, and dynamically causes a corresponding modification to a second set of instances of parent-child Policy Objects that are utilized by a second PU. The QoS policy is enforced, on a packet-by-packet basis, by different member entities of the tree hierarchy representation, to achieve the overall QoS policy.

The present invention may provide other and/or additional advantages and/or benefits.

DETAILED DESCRIPTION OF SOME DEMONSTRATIVE EMBODIMENTS

Figure 1:
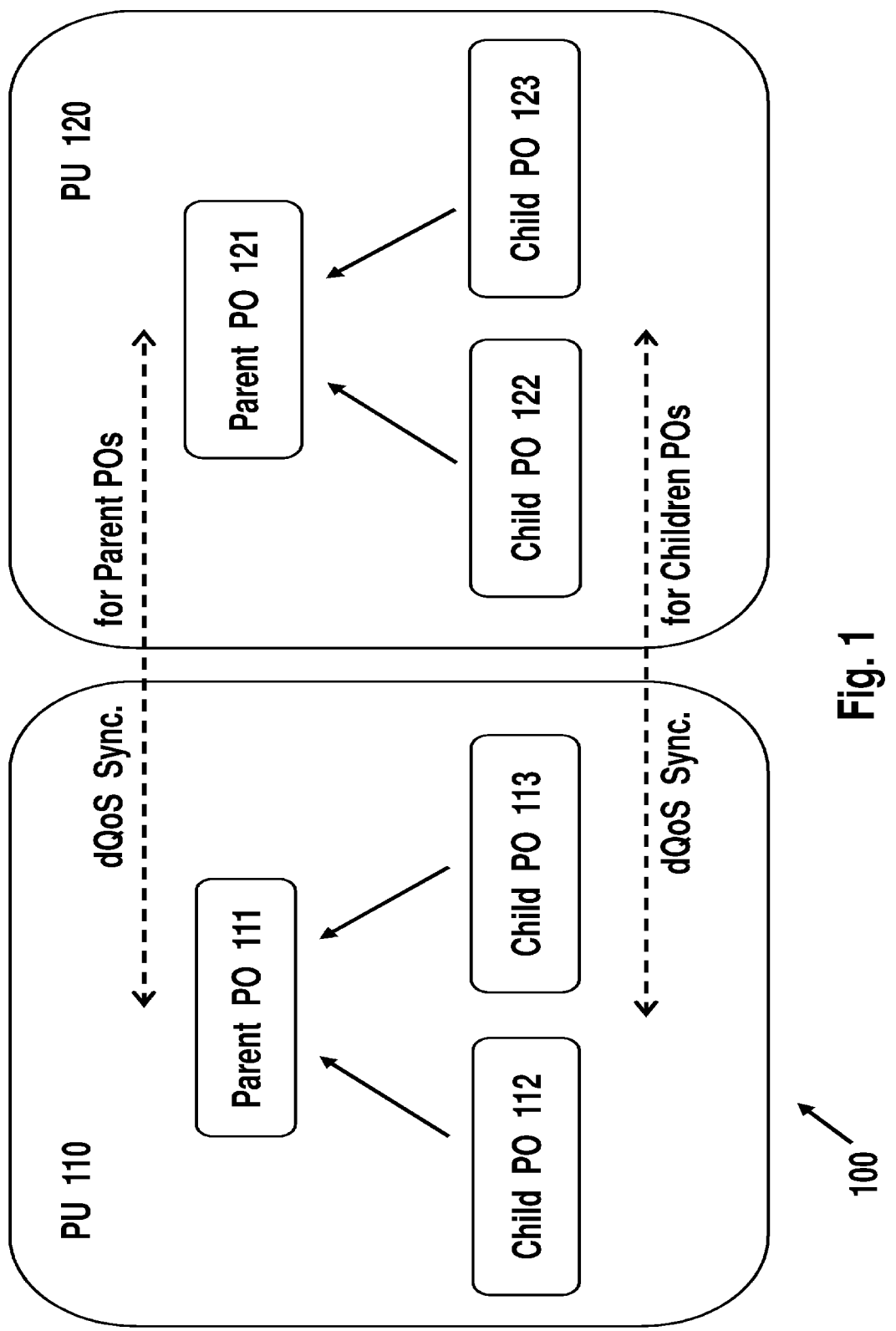
FIG. 1 is a schematic illustration of a set of Policy Object trees which may be utilized and synchronized, in accordance with some demonstrative embodiments of the present invention.

In accordance with some embodiments of the present invention, the terms "Quality-of-Service" or "QoS", or "Distributed QoS" or "D-QoS" or "DQoS", or a parameter or value or indictor or descriptor or score or policy or set of rules or set of constraints that correspond to them, may describe or indicate a level of assurance of sufficiently low delay and/or sufficiently low packet loss, for one or more certain types of applications and/or traffic, and/or in comparison to one or more pre-define threshold values or to a threshold range-of-values. Service differentiation that is based on meeting certain QoS requirements or minimum values, may enable or may require a service provider or a communication network to provide different services to different applications (or, to different types of traffic) according to their respective requirements. Bandwidth (BW) is a fundamental network resource, as its allocation may determine an application's maximum throughput and, in some cases, the bounds on end-to-end delay.

Some embodiments of the invention may operate to provide, utilize, define, manage, and enforce Distributed QoS, or a QoS policy that may be distributed across and/or enforced by two or more separate entities or units or devices. For example, several branches of the same enterprise or organization, may be connected (e.g., each one separately) to different Central Office (or Regional Offices). In such case, managing the QoS Policy function for this enterprise is distributed between or among the Central Offices (or Regional Offices), and all the instances of the QoS policy members have to be synchronized. The function may become more complicated, when the system utilizes also sub-policies per flow-type or per applications or per application-type (e.g., for VoIP, for business-critical applications, for streaming video applications, for Web browsing, or the like). Embodiments of the present invention may thus implement a method and system to achieve such synchronization, in dynamic and real-time or near-real-time manner, to ensure that a QoS policy, or multiple such policies and optionally sub-policies, is (or are) being correctly enforced by such multiple, distributed, instances of the participating members or entities, even if such entities are remote to each other or are not co-located next to each other. In some embodiments, the different members or entities may be different Processing Unit (PU) entities or devices, or nodes or communication nodes or network nodes or other network elements, for example, a router, a switch, a gateway, a communication hub, a packet forwarding unit, a packet relay unit, a packet transmission unit, a packet re-transmission unit, a server, a proxy server, a cache unit or cache server or caching element, a network-connected storage unit, a Network Function (NF), a NF implemented using a hardware component and/or software component, a virtualized NF, a cloud-based NF, or other such entities which may operate in series and/or in parallel or in a distributed architecture.

In accordance with some embodiments, there are two main mechanisms for controlling bandwidth and/or for providing such differentiation: Traffic Policing, and Traffic Shaping. In traffic policing, packets that exceed a pre-defined or pre-allocated BW budget or quota or limit, are dropped, to thereby ensure that other services and/or other subscribes are able to utilize available bandwidth; and this may be a preferred approach for services which are more sensitive to delay and/or jitter than to packet loss (e.g., real time Voice-over-IP (VoIP) or video conferencing). In traffic shaping, packets that exceed the bandwidth budget or quota are buffered for later or subsequent transmission at a time in which the bandwidth budget or quota is re-allocated or renewed or otherwise replenished for the service; and this may be a preferred approach for services which are sensitive to packet loss, and/or for communication protocols such as Transmission Control Protocol (TCP), video streaming over Quick UDP Internet Connection (QUIC), or other services that adapt to available bandwidth by reducing the transmission rate.

In accordance with some embodiments of the present invention, a Network Function (NF) may be responsible for distributed QoS ("dQoS" or "DQos") control, and may be able to perform some or all of the following: (a) to identify traffic flows, and to aggregate or group or cluster them (when needed) into flows having a corresponding or assigned treatment or handling manner (e.g., grouping of (or based on) subscriber sessions, application groups, traffic from certain network areas or cells, or other grouping parameters or aggregation criteria); (b) to monitor and count or measure the bandwidth that is used or consumed by the relevant flows and by the aggregations of flows; (c) to enforce a DQoS policy, for example, by applying associated treatment or handling rules to one or more received packets or packets that are intended to be relayed or transmitted or re-transmitted or forwarded or processed or otherwise handled.

In some embodiments, a Traffic Policy or a traffic handling policy may be represented as a hierarchical tree of Policy Objects. For example, each such Policy Object may be, or may comprise, a pair of a Condition and a corresponding Treatment. A Policy Object that is located on an upper level in the tree, is a "parent" of a Policy Object located on a lower level of that tree. A Policy Object located on lower level of the tree, is a "child" of a Policy Object located on an upper level of that tree. A parent Policy Object may have one or more children Policy Object(s); whereas a child Policy Object has only a single parent Policy Object.

The Applicants have realized that in some network topologies, some or all of the traffic flows of the same session may be routed over different paths, in the upstream direction and/or in the downstream direction. Moreover, in systems that utilize a cluster of stateless NFs, even the same traffic flow or the same stream can be processed on different Processing Units (PU), such as, two or more different servers, NFs, micro-services, or the like. The Applicants have realized that in such situations, a single PU may "see" or may handle or may process, or may be aware of, only a partial portion of the traffic of the entire session, and not the entirety of the traffic of that session. The Applicants have realized that in such situations or topologies, it may not necessarily be possible to assure that all the traffic that is associated with a particular given Policy Object, will be handled by the same single PU; and therefore, realized the Applicants, there is a need for the involved PU to have the same set of Policy Objects as other PU(s) or handling entities have, and there is a need to achieve dynamic or real-time synchronization between or among such multiple PUs. The Applicants have realized that there is a need for a system and a method for synchronized QoS control and policy enforcement in distributed environment. In some embodiments of the present invention, each PU has (or is associated with, or utilizes) the same set of Policy Objects, and the method and system achieve or enable dynamic or real-time synchronization among such multiple PUs.

Reference is made to FIG. 1, which is a schematic illustration of a set 100 of Policy Object trees which may be utilized and synchronized, in accordance with some demonstrative embodiments of the present invention. A first Processing Unit (PU) 110 has a Parent PO 111, which in turn has two Child POs: a Child PO 112, and a Child PO 113. Similarly, a second PU 120 has a Parent PO 121, which in turn has two Child POs: a Child PO 122, and a Child PO 123. The method and system of the present invention enable coordinated traffic processing in the context of a policy hierarchy; such as, each Parent PO instance has two Child Pos instances underneath it in the tree. As indicated by the horizontal dashed arrows, the system and method may enable coordination or synchronization among the Parent POs (111 and 121), and/or among the Child POs (112-113 and 122-123).

In some embodiments, for example, PU 110 and PU 120 may initially have separate or parallel instances of the same POs (parent PO and/or child POs); and the system and method of the present invention may ensure that if PU 110 modifies or updates or adds or deletes or configures or otherwise affect its instance of the Parent PO 111, then the corresponding instance of that Parent PO in the PU 120 (which is Parent PO 121) is dynamically and/or automatically updated accordingly. Additionally or alternatively, the system and method of the present invention may ensure that if PU 110 modifies or updates or adds or deletes or configures or otherwise affect its instance of Child PO 112, then the corresponding instance of that Child PO in the PU 120 (which is Child PO 122) is dynamically and/or automatically updated accordingly. Such updating of corresponding instance(s) at other PU entities, may be performed in real-time or in near-real-time, e.g., within 1 or 2 seconds from the performance of the original instance modification, and/or may be performed at pre-defined time-intervals or time-points or time-slots (e.g., every second, every 15 seconds, every minute, or the like).

In some embodiments, the system may utilize two mechanisms to achieve said results: (a) a Periodic Control mechanism, which sets, modifies, monitors and/or tracks the bandwidth allocation associated with various Policy Elements or Policy Objects, at particular or pre-defined time intervals; (b) an Enforcement mechanism which operates to dynamically enforce QoS in hierarchical manner as packets are received or processed by the system.

Figure 2:
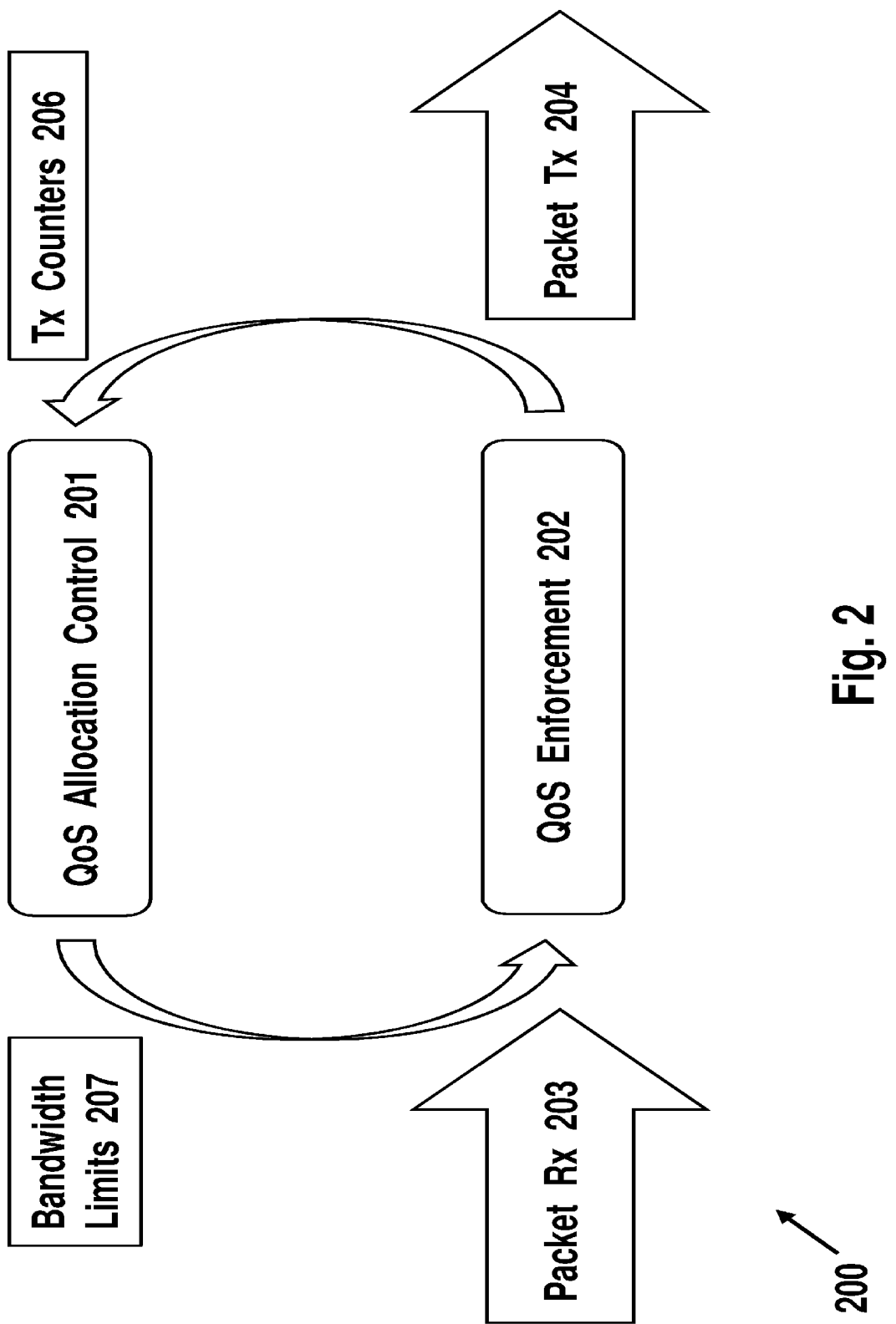
FIG. 2 is a schematic illustration demonstrating a system implementing Periodic Macro QoS Control and feedback loop, in accordance with some demonstrative embodiments of the present invention.

Reference is made to FIG. 2, which is a schematic illustration demonstrating a system 200 implementing Periodic Macro QoS Control and feedback loop, in accordance with some demonstrative embodiments of the present invention. It may utilize two types of calculations: (a) Parent calculation, in which a Parent entity calculates or determines (e.g., autonomously) the basic bandwidth share (or bandwidth quota) that its own Child entities are required to enforce; and such parent calculation is performed on (or at, or by) all on all parents entities; (b) Mate calculation (or peer calculation, or leaf calculation), in which a Leaf entity (e.g., the last or the lowest Policy Object in a given chain or branch of the PO hierarchical tree) calculates or determines the bandwidth share (or bandwidth quota) that each mate participating in a child entity is required to enforce.

As demonstrated, system 200 may comprise a QoS Allocation Control unit 201 and a QoS Enforcement unit 202, having a feedback loop between them. The QoS Allocation Control unit 201 sets or modifies the bandwidth limits 207, which the QoS Enforcement unit 202 enforces on a stream or batch of packets (e.g., incoming as Packet Rx 203, and outgoing as Packet Tx 204); and the QoS Enforcement unit

202 updates back the QoS Allocation Control unit 201 with regard to the bandwidth that was actually used, via updating of one or more Tx counters 206 whose value(s) are fed back to the QoS Allocation Control unit 201.

In a demonstrative Parent Calculation, a parent entity calculates the bandwidth share (denoted ChildShare) that its child entities are required to enforce. For example, for parent entity p, at time interval t, the parent entity performs the parent calculation of ChildShare as:

$$ChildShare_p(t) = f\left(ChildShare_p(t-t_c),\right.$$

$$\left.StaticMaxQoS_p, DynamicMaxQoS_p, \sum_{children\ of\ p} Tx(t-\text{up to}\ t_u)\right)$$

In the above example, $t_c$ indicates the control interval for the parent entity;

$ChildShare_p(t-t_c)$ indicates the previous calculated ChildShare for the parent p;

$StaticMaxQoS_p$ indicates a static maximum bandwidth value (or QoS value) for the parent entity, for example, as defined in the QoS policy;

$DynamicMaxQoS_p$ indicates a dynamic maximum bandwidth value (QoS value) for the parent entity.

The value of $DynamicMaxQoS_p$ may be calculated as:

$$DynamicMaxQoS_p = ParentPriority*ChildShare(t-\text{up to}\ t_u)$$

wherein $t_u$ indicates the time interval used for exchange of QoS counters or data between PU entities; and wherein $$\sum_{children\ of\ p} Tx(t-\text{up to}\ t_u)$$

indicates the sum of transmitted traffic by all the child entities of the parent entity p, as last received, and which may be up to $t_u$ in the past.

A demonstrative Mate Calculation (or Leaf Calculation) may be performed by a Leaf PO, namely, the lowest level in a tree hierarchy of POs. For example, for a PO that is distributed across multiple Pus (or having instances at different PUs), the Mate Calculation calculates or determines the bandwidth share that each one of the local instances of the PO is required to enforce, in order to achieve the overall target bandwidth enforcement associated with that PO.

For example, for a distribute PO denoted o, at time interval t, the Mate Calculation determines the bandwidth share that each Child of the local policy instances needs to enforce, by calculating:

$$MateShare_o(t) = f\left(MateShare_o(t-t_c), Priority_o,\right.$$

$$\left.ChildShare_{parent\ of\ o}(t-\text{up to}\ t_u), \sum_{all\ mates\ in\ o} Tx(t-\text{up to}\ t_u)\right)$$

In the above, $t_c$ indicates the control time-interval for the element;

$MateShare_o(t-t_c)$ indicates the previous calculated MateShare for object o;

$Priority_o$ indicates a priority value for object o, governing that object's relative share weight;

$ChildShare_{parent\ of\ o}(t-\text{up to}\ t_u)$ indicates the most up-to-date basic bandwidth share calculated by the parent of object o for all its children, which may be up to $t_u$ in the past; and wherein $$\sum_{all\ mates\ in\ o} Tx(t-\text{up to}\ t_u)$$

indicates the sum of transmitted traffic from all local instances of object o (all mates), which may be up to $t_u$ in the past.

The system may implement a Periodic Operation mechanism: to ensure control stability, and/or to avoid or prevent positive feedback loops between enforcement and controller, the control loop operates at pre-defined time-periods or time-points or time intervals, thereby ensuring sufficient delay between iterations or control decisions, to allow time for information propagation, enforcement, and collection of data representing the impact of the control decision back to the controlling unit. For example, in some embodiments, the results of the last bandwidth calculations (as well as QoS Tx and Rx Counters, which are used for Parent, Mate and QoS Activation calculations) are exchanged between or among PU entities every time-interval $t_u$ seconds. Such exchange of information may be staggered; for example, each PO may send its information at a different time within the $t_u$ time-interval, to avoid peaks in communication traffic processing. In some embodiments, the bandwidth budget for each local instance of the PO is defined per time-slice, denoted $Ts_i$.

Some embodiments may further implement a Micro QoS Control mechanism, which operates at the lowest enforcement level of a PO tree hierarchy. For example, at the beginning of each time-interval slice, Ts, the bandwidth budget for the local instance on the m-th PU (denoted PU m) is re-assigned or re-allocated for spending locally during that Ts. The spending of the allocated bandwidth budget during that Ts, may be performed by one or more suitable methods, such as, Expedited Forwarding, or Traffic Pacing.

In the Expedited Forwarding method, the allocated bandwidth budget is spent as soon as it is not empty and there is a packet that arrived and is ready for re-transition or re-transmission or forwarding towards its destination. Packets are sent out or relayed or re-transmitted towards their destination as soon as they arrive, if there are sufficient allocation units within the Ts bucket of bandwidth, thereby minimizing or reducing packet drop due to QoS in bursts that occur early in the Ts time-interval slice. However, in some situations, the full allocation of the bandwidth bucket of that Ts is rapidly spent or consumed within a small part or portion of the Ts time-interval slice (e.g., within the first 200 milliseconds of the Ts); and as QoS action will prevent transmission until the next Ts, all further traffic on the local pipe will be dropped (e.g., in the next 800 milliseconds of the Ts, assuming that a time-interval slice of 1 second is used). Such behavior induces "burstiness" in overall network traffic, characterized by spaced-apart bursts of packet transmissions; and it may be appropriate or beneficial for particular types of applications or for particular applications, but not necessarily for all application-types or applications.

In the Traffic Pacing method, the allocated bandwidth budget is firstly divided into smaller portions that are spread over the Ts time-interval slice, and this ensures that the allocated bandwidth budget is spent gradually throughout the Ts time-interval slice, in a manner that reduces "burstiness" or bursts of packet transmissions. For some applications or types of applications, Traffic Pacing may provide improved user experience, as it allows transmission optimization of adaptive protocols such as TCP. The Traffic Pacing mechanism utilizes two elements: a Time Tick, which is a one millisecond time-interval, for which the bandwidth budget is calculated for upper-level PO; and a MaxBurstTime time interval (e.g., in milliseconds), which limits the time of burst transmission during the Ts time-interval slice.

A demonstrative method for calculating or determining the bandwidth budget that would be allocated per Time Tick, for Ts time-interval slice, is as follows.

Firstly, at the beginning of the time-interval slice $Ts_i$, per PU m and per PolicyObject_j, a micro-bandwidth granular unit is calculated, as a portion of the overall bandwidth budget for the local PO instance, such as using:

$$uBW=\text{\textonesuperior}/_{1000}*\text{PolicyObject\_j\_BW\_Allocation}_i^m$$

Additionally, the bandwidth budget used for QoS enforcement in the local PO instance is being reset to $$\text{MaxBurstTime}*uBW.$$

and this will be the allocated bandwidth micro-budget for $Tk_{i,0}$, which is the first one millisecond of the time-interval slice $Ts_i$.

Secondly, every subsequent Time Tick, denoted $Tk_{i,1 \ldots (1000-MaxBurstTime-1)}$, one additional uBW unit will be added to the bandwidth micro-budget of the PO instance. Thirdly, after P milliseconds, wherein P is for example 1,000–MaxBurstTime–1, the sum of all the PolicyObject_j_BW_Allocation$_i^m$ will reach the bandwidth budget that has been allocated to that PO instance. No additional uBW unit(s) will be added for the last MaxBurstTime of $Ts_i$.

Figure 3:
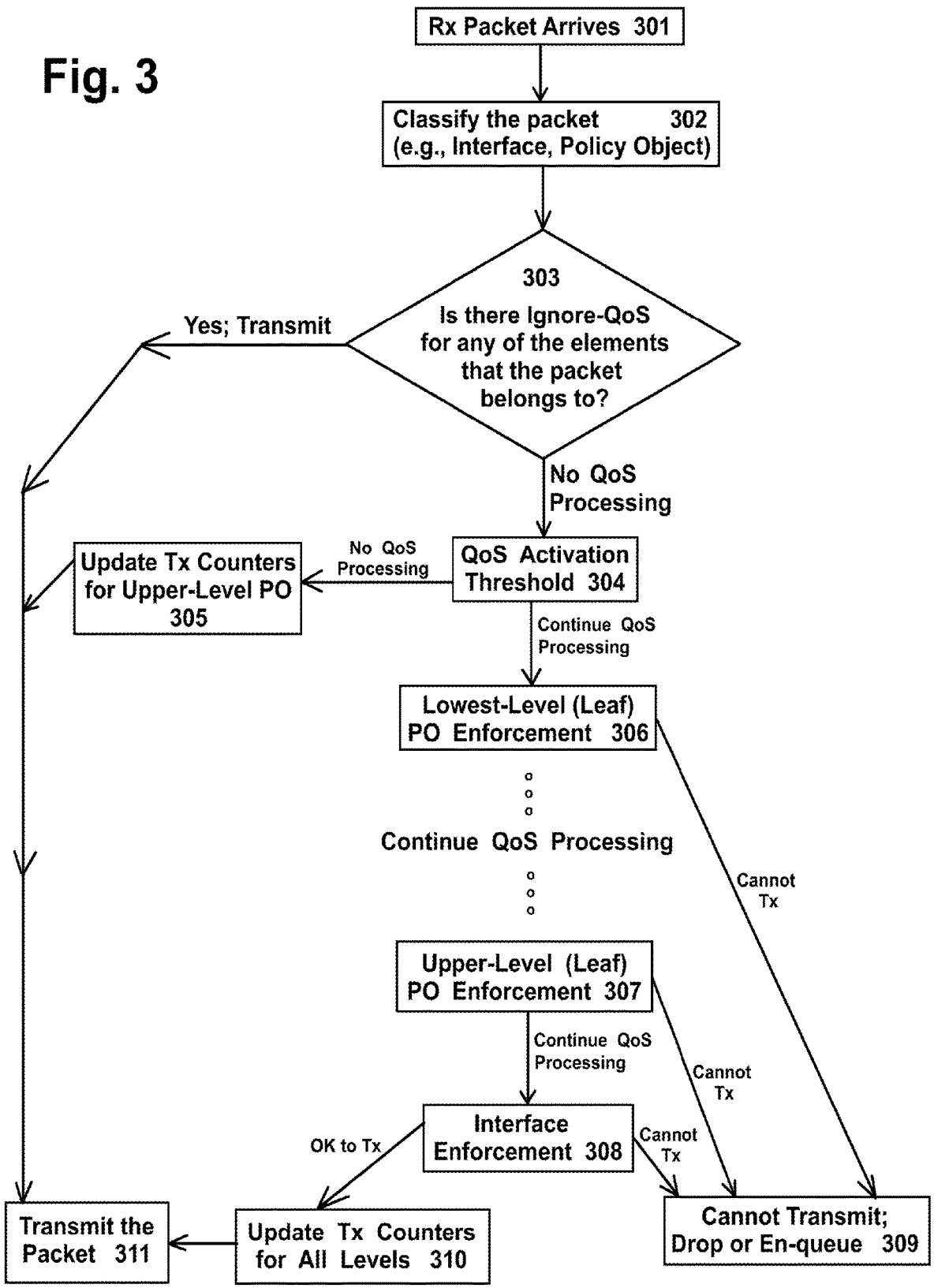
FIG. 3 is a block diagram of a method of QoS enforcement, in accordance with some demonstrative embodiments of the present invention.

Reference is made to FIG. 3, which is a block diagram of a method of QoS enforcement, in accordance with some demonstrative embodiments of the present invention. The enforcement may manipulate or modify traffic and/or packet(s), in accordance with a QoS policy intended for enforcement or in order to achieve limits or constraints defined in such QoS policy. The enforcement may be performed, typically, on a packet-by-packet basis; although in some implementations or with regard to some applications or application-types, it may be performed on the basis of a batch or group of packets.

The method begins by receiving or obtaining or accessing a packet that is intended for transmission or re-transmission or processing or relaying or forwarding or otherwise handling (block 301). The packet is classified (block 302), for example, by or based on interface, PO, or other classification criteria; in some implementations, Deep Packet Inspection (DPI) techniques may optionally be used to assist or perform packet classification.

The method checks whether there is an Ignore-QoS flag or indication with regard to said packet or with regard to any of the elements that this packet belongs to (block 303). If the check result is positive, then the method proceeds to ignore QoS criteria or to skip enforcement of QoS policies on this packet, and proceeds to transmit said packet towards its destination (block 311). Conversely, if the check result is negative, then QoS processing does not yet begin; rather, the method checks whether a pre-defined threshold value has been reached in order to trigger activation or commencement of QoS enforcement (block 304). If the QoS enforcement activation threshold was not yet reached, then the method proceeds to update the Tx counters for the upper-level PO (block 305), and proceeds to transmit the packet towards its destination (block 311). Otherwise, if the QoS enforcement activation threshold was reached, then the method continues by performing QoS enforcement.

The QoS enforcement may be performed in stages, starting with QoS enforcement based on the lowest-level leaf PO (block 306), and continuing upwardly through the PO tree hierarchy up until (and including) the upper-level leaf PO (block 307). If during the QoS enforcement (blocks 306, 307, and other QoS enforcement operations between them) the method determines that it cannot transmit the packet, then appropriate no-transmit actions are taken (block 309), such as dropping the packet or enqueueing the packet.

The method proceeds with interface enforcement (block 308). If its result is that the method cannot transmit the packet, then appropriate no-transmit actions are taken (block 309). Otherwise, the Tx counters for all levels are updated (block 310), and the packet is transmitted towards its destination (block 311).

As demonstrated in this block diagram, the QoS enforcement flow operates from the lowest policy level to the upper policy level, selecting the QoS action (e.g., transmit the packet, drop the packet, or queue the packet) based on the worst-case result of evaluating traffic counters (or Tx counters) against the allocated bandwidth budget. The "Ignore-QoS" may be assigned to (or may point to, or may be associated with) a particular PO, in order to trigger exclusion of this PO and its descenders (children, grandchildren, and so forth) from QoS enforcement and/or from dQoS calculations.

The QoS enforcement activation based on a threshold (block 304) may be implemented since in certain in certain time-slots (e.g., a time of day which is non "rush hour" from traffic consumption point-of-view), some PO instances may receive significantly less traffic than the Maximum Bandwidth (MaxBW) that was allocated to such PO instances. Therefore, in order to optimize or improve the utilization of computing resources and/or overall performance, unnecessary QoS enforcement activity may be disabled or paused for a certain period of time. For example, the following ratio may be calculated every Ts time-slice interval, based on the dQoS transmission of Object_Rx from the m PUs:

$$\frac{\sum_{m=1}^{M} \text{Object\_Rx}^m}{\text{ObjectMaxBW}}$$

While that ratio is below a pre-defined QoS Enforcement Activation Threshold, then detailed dQoS processing for the object is de-activated, and all received packets for the object are forwarded; and the associated Rx and Tx counters are updated. In some implementations, the default threshold value for QoS enforcement activation may be set to zero, to ensure that QoS enforcement is always active and performed.

Figure 4:
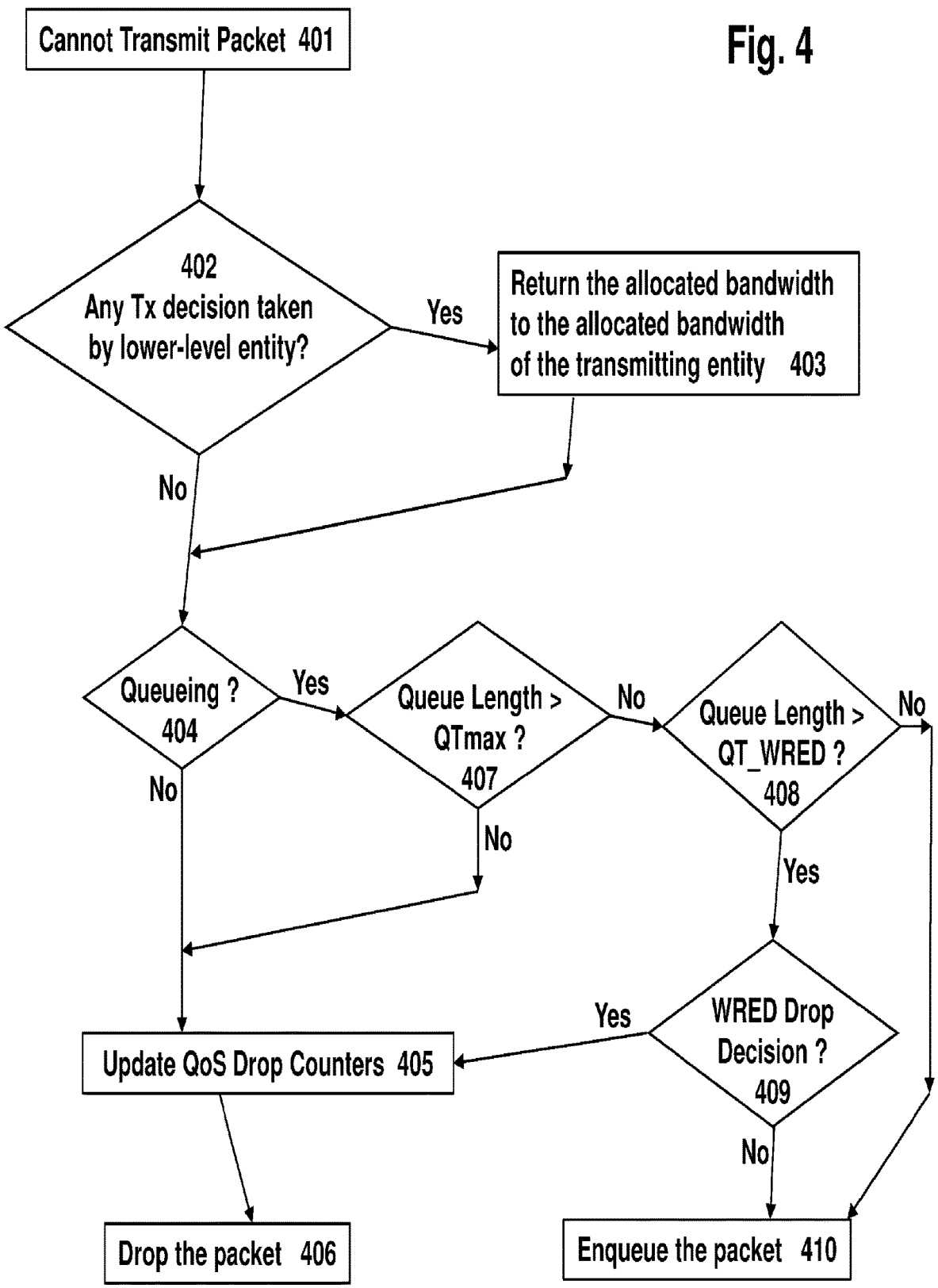
FIG. 4 is a block diagram of a method of packet handling which may be performed as part of QoS policy enforcement, in accordance with some demonstrative embodiments of the present invention.

Reference is made to FIG. 4, which is a block diagram of a method of packet handling which may be performed as part of QoS policy enforcement, in accordance with some demonstrative embodiments of the present invention. Particularly, it demonstrates queueing or re-queueing or placing-in-queue of a packet, or dropping the packet, as part of QoS policy enforcement. The method demonstrates a "drop or place-in-Tx-queue" decision block, as these are two relevant actions that may be taken to avoid transmission or re-transmission of a particular packet once the allocated bandwidth is exceeded. A "packet drop" decision causes the method to discard the packet, and to avoid transmitting it now and also subsequently. A "queueing" decision, or a "placement in transmission queue" decision, causes placement or adding of the packet to a transmission queue, such as a First In First Out (FIFO) buffer or queue, for subsequent transmission or re-transmission, e.g., to be transmitted once sufficient bandwidth becomes allocated and available and in accordance with FIFO ordering.

The method begins with a determination that a particular packet, that arrived and that is intended to be relayed or transmitted or forwarded towards its destination, cannot be transmitted (block 401). The method checks (block 402) whether any transmission decision was already made or taken by a lower-level entity in the PO tree hierarchy. If the check result is positive, then the bandwidth budget or micro-budget that was already allocated towards the intended transmission of that particular packet, is returned or added (block 403) to the overall bandwidth budget that is allocated to the entity that was intended to perform that transmission but cannot transmit. If the check result is negative, then no such adding is required.

The method proceeds by checking (block 404) whether queueing is enabled, or is indicated or selected or pre-defined as a relevant packet-handling method, for the packet that cannot be transmitted. If queueing is not enabled, or is disabled, or is otherwise not selected or not associated with the packet at hand, then the method proceeds towards dropping this packet, such that it would not be queued or re-queued for subsequent transmission, but rather, would be discarded from any transmission buffer or from a group of packets that are intended for transmission. For such packet drop operation, the method updates the relevant QoS-related packet drop counter(s), to indicate that this packet is dropped (block 405), and then drops the packet (block 406).

In some embodiments, packet drop may be beneficial (and packet queueing may be less beneficial or non-beneficial) for certain communication protocols, such as non-adaptive protocol. However, in other protocols, such as adaptive protocols (e.g., TCP, or QUIC, or protocols utilized by YouTube and some other streaming servers), it may be more beneficial to queue or buffer the packet for later transmission (even though a greater latency is induced), rather than dropping the packet (which may cause re-transmission of the dropped packet).

In some implementations, a Queueing parameter value (e.g., true or false) may be toggled, or may be set or modified, to indicate whether queueing is enabled or disabled; optionally, it may be selectively disabled (or enabled) through Policy settings, per PO. In some embodiments, when the available bandwidth budget is zero, packets that are being transmitted (or that are intended for transmission) over adaptive communication protocol(s) should be placed into a FIFO queue per policy instance. In the next Time Tick, such as after one millisecond, if the new or updated bandwidth budget is non-zero, then queued packet(s) should be pulled out from the transmission queue via FIFO logic, and transmitted towards their destination.

Conversely, if the checking of block 404 indicates that placing the packet in a queue for subsequent transmission is a relevant or suitable handling manner, then the method proceeds with the operations of blocks 407-410 (or some of them) for queue management. In block 407, the method checks whether the length of the transmission queue is greater than a maximum queue-length value or maximum threshold, denoted QTmax. If the checking result of block 407 is positive, then queueing cannot be performed for this packet; and the method avoids placement of this packet in the transmission queue, and proceeds instead to drop the packet (blocks 405-406).

If the checking result of block 407 is negative, such that the maximum queue length was not yet reached, then the method proceeds to block 408, which checks whether the queue length is greater than another threshold, denoted QT_WRED. In this threshold value, WRED indicates Weighted Random Early Detection to stochastically determine whether to drop the packet or place it in the queue. The WRED mechanism and the associated QT_WRED threshold value, reflect a drop precedence value or a drop priority value (e.g., High, Medium, Low), which may be set or configured by the QoS policy and/or automatically (e.g., per application, or per application-type). If checking result of block 408 is negative, then the method proceeds to place the packet in the transmission queue (block 410). Conversely, if the checking result of block 409 is positive, then the method proceeds (block 409) to firstly determine, stochastically based on WRED logic, whether to drop the packet or to place it in queue; and proceeds according to the stochastic determination, either to drop the packet (blocks 405-406) or to place it in the transmission queue (block 410).

Figure 5:
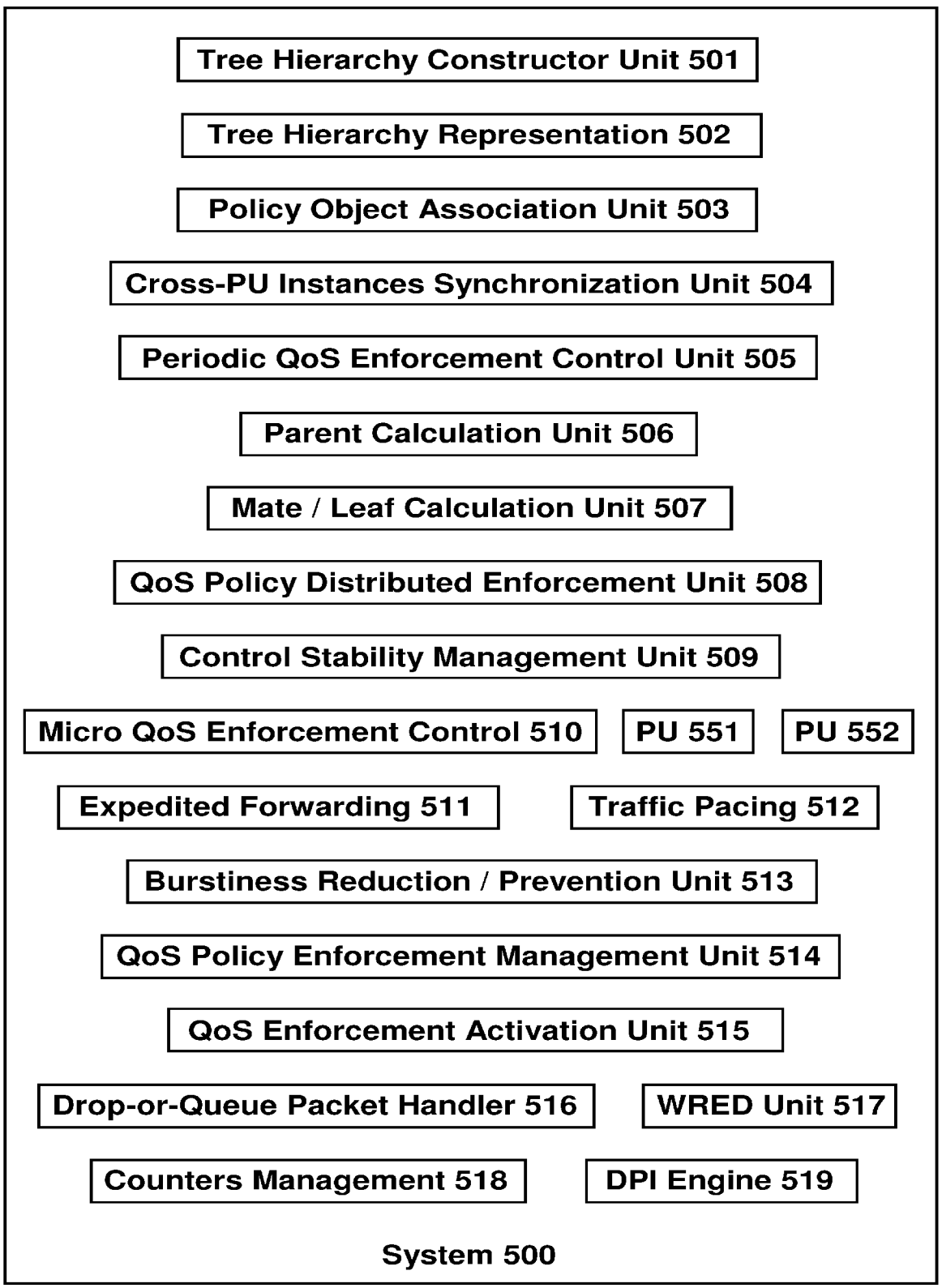
FIG. 5 is a schematic illustration of a system for distributed QoS policy enforcement, in accordance with some demonstrative embodiments of the present invention.

Reference is made to FIG. 5, which is a schematic illustration of a system 500 for distributed QoS policy enforcement, in accordance with some demonstrative embodiments of the present invention. System 500 may comprise one or more of the components described herein and/or above; and may be implemented as a single apparatus, or as a set of physical components and/or virtual components and/or virtualized components and/or cloud-based components. In a demonstrative embodiments, system 500 receives an incoming packet, that is intended to be forwarded or relayed or transmitted-out to (or towards) a destination or towards an intended recipient of the packet; and system 500 performs one or more processing operations, packet handling operations, and distributed QoS enforcement operations, whose result is (for example) transmission of the incoming packet towards its destination (e.g., immediate transmission), or placement of the packet in a transmission queue for later (subsequent) transmission once sufficient bandwidth is allocated, or dropping (discarding) of the packet.

In some embodiments, a Tree Hierarchy Constructor Unit 501 operates to construct a tree hierarchy representation 502 that corresponds to distributed enforcement of a Quality-of-Service (QoS) policy on incoming packets that are intended for transmission towards a destination. The tree hierarchy representation is utilized by (or is accessible by, or is associated with) at least two separate Processing Units (PUs, such as PU 551 and PU 552) that separately process different packets that are intended for transmission towards said destination.

A Policy Object Association Unit 503 operates to associate between (I) a first set of instances of parent-child Policy Objects of QoS enforcement, and (II) a first PU; and to separately associate between (i) a second set of instances of said parent-child Policy Objects of QoS enforcement, and (ii) a second PU.

A Cross-PU Instances Synchronization Unit 504 operates to automatically determine that the first PU caused modification of said first set of instances of said parent-child Policy Objects that are utilized by the first PU, and to dynamically cause a corresponding modification to said second set of instances of said parent-child Policy Objects that are utilized by the second PU.

The Cross-PU Instances Synchronization Unit 504 operates to dynamically synchronize, in real-time or in near-real-time, multiple instances of a Parent policy object of QoS enforcement that are associated separately with two or more PUs; and/or, the Cross-PU Instances Synchronization Unit 504 is to dynamically synchronize, in real-time or in near-real-time, multiple instances of a Child policy object of QoS enforcement that are associated separately with two or more PUs.

A Periodic QoS Enforcement Control Unit 505 operates to perform periodic control at pre-defined time intervals of QoS enforcement by setting and tracking bandwidth bucket allocations for Policy Objects of said tree hierarchy representation that are utilized for QoS enforcement by said PUs.

The Periodic QoS Enforcement Control Unit 505 may comprise (or may be associated with or may utilize) a Parent Calculation Unit 506, which operates to calculate for an instance of a parent Policy Object a basic quota of allocated bandwidth that is required to be enforced by Children objects of said parent Policy object. The Parent Calculation Unit 506 operates on each Parent policy object of QoS enforcement.

The Parent Calculation Unit 506 operates to determine said basic quota of allocated bandwidth based on at least: (i) a previously-calculated value of said basic quota, (ii) a static maximum bandwidth value, (iii) a dynamic maximum bandwidth value, (iv) a sum of transmitted traffic by all children of said parent Policy Object, (v) a time-interval for exchanging QoS enforcement counters among different PUs.

The Periodic QoS Enforcement Control Unit 505 may further comprise (or may be associated with or may utilize) a Mate/Leaf Calculation Unit 507, to calculate for an instance of a leaf Policy Object a quota of allocated bandwidth that is required to be enforced by each instance of each corresponding leaf Policy Object in order to achieve an overall target bandwidth constraint that is required to be implemented by all instances of said Leaf policy object across all PUs.

The Mate/Leaf Calculation Unit 507 may calculate said quota of allocated bandwidth that is required to be enforced by each instance of each corresponding leaf Policy Object based on at least: (i) a priority indicator for the leaf Policy Object, (ii) a sum of transmitted traffic by all local instances of said leaf Policy Object.

A QoS Policy Distributed Enforcement Unit 508 (which may also be referred to as a Distributed QoS Policy Enforcement Unit) operates to enforce said QoS Policy in a distributed and hierarchical manner, as incoming packets are received for transmission towards their destination, based on said tree hierarchy representation; it operates on a packet-by-packet basis, while also ensuring that the overall enforcement operations of the various distributed members or entities achieve the defined QoS policy and are within the constraints set by such overall QoS policy.

A Control Stability Management Unit 509 operates to implement a pre-defined control time-interval for data collection and for propagation of updated bandwidth quota information, between successive iterations of calculations of bandwidth buckets that are allocated to parent Policy Objects or to child Policy Object.

The Periodic QoS Enforcement Control Unit 505 may comprise (or may be associated with, or may utilize) a Micro QoS Enforcement Control Unit 510, configured to operate on a lowest level of QoS enforcement in said tree hierarchy.

The Micro QoS Enforcement Control Unit 510 may comprise (or may utilize, or may be associated with) an Expedited Forwarding Unit 511 to enable immediate or substantially-immediate or non-delayed spending (or consumption, or utilization by packet transmission) of a non-zero allocated bandwidth budget as soon as an incoming packet arrives for transmission towards said destination.

The Micro QoS Enforcement Control Unit 510 may comprise (or may utilize, or may be associated with) a Traffic Pacing Unit 512, which operates (i) to receive a non-zero allocated bandwidth budget for a time-interval, and (ii) to divide said time-interval into N consecutive time-slices that together form said time-interval, and (iii) to divide the non-zero allocated bandwidth budget into N bandwidth micro-buckets, and (iv) to allocate each one of the N bandwidth micro-bucket to a corresponding time-slice of the N time-slices of said time-interval; wherein N is a pre-defined positive integer, such as 100 or 128 or 1,000 or 1,024.

The Traffic Pacing Unit 512 may utilize a Burstiness Reduction/Prevention Unit 513, which limits a time-period of "bursty" or burst-characterized transmissions within said time-interval, based on a pre-defined value of maximum burst time that is allowed within said time-interval.

A QoS Policy Enforcement Management Unit 514 operates to manage enforcement of said QoS policy on a packet-by-packet basis, separately on each incoming packet that arrives and is intended for transmission towards said destination.

The QoS Policy Enforcement Management Unit 514 operates on each packet by firstly enforcing a first QoS enforcement rule (or a first QoS constraint) that is represented by a leaf Policy Object; and then enforcing a second QoS enforcement rule (or a second QoS constraint) that is represented by a parent policy object that is a parent of said leaf policy object.

The QoS Policy Enforcement Management Unit 514 operates to enforce the QoS policy on a particular packet, only if a QoS Enforcement Activation Unit 515 has determined that a pre-defined QoS Enforcement Activation Threshold was reached.

In some embodiments, the QoS Policy Enforcement Management Unit 514 operates on each particular packet by selecting one packet-handling route out of a group of packet-handling routes consisting of: (i) transmission of the packet towards its destination if there is a sufficient currently-available bandwidth budget, (ii) discarding of the packet, (iii) placement of the packet into a transmission queue for subsequent transmission once a sufficient bandwidth budget becomes available.

In some embodiments, the QoS Policy Enforcement Management Unit 514 comprises (or utilizes, or is associated with) a Drop-or-Queue Packet Handler 516, to determine that a particular packet cannot be transmitted due to insufficient allocated bandwidth for transmission, and to determine either (i) to drop the particular packet, or (ii) to place the particular packet in a transmission queue for subsequent transmission once a sufficient bandwidth budget becomes available.

In some embodiments, the Drop-or-Queue Packet Handler 516 is to drop said particular packet if a communication protocol in use is a non-adaptive communication protocol.

In some embodiments, the Drop-or-Queue Packet Handler 516 is to place said particular packet in said transmission queue, if (I) a communication protocol in use is an adaptive communication protocol, and (ii) a current length of said transmission queue is smaller than a pre-defined maximum threshold value.

In some embodiments, the Drop-or-Queue Packet Handler 516 is to place said particular packet in said transmission queue, if (I) a communication protocol in use is an adaptive communication protocol, and (ii) a current length of said transmission queue is smaller than a pre-defined maximum threshold value.

In some embodiments, the Drop-or-Queue Packet Handler 516 is to place said particular packet in said transmission queue, if (I) a communication protocol in use is an adaptive communication protocol, and (ii) a current length of said transmission queue is smaller than a pre-defined maximum threshold value, and (iii) ad-hoc execution of a Weighted Random Early Detection (WRED) process by a WRED Unit 517 which stochastically selects queue placement and not packet drop.

A Counters Management Unit 518 operates to dynamically update one or more counters that are utilized by said system and that comprise at least one of: (i) a transmuted packets counter, (ii) a dropped packets counter, (iii) a currently-queued packets counter.

Optionally, system 500 may comprise, or may utilize or may be associated with, a Deep Packet Inspection (DPI) Engine 519, which may be configured (i) to perform DPI on one or more incoming packets that are intended for transmission towards said destination, (ii) to generate a DPI-based result that indicates an application that a particular packet is associated with (e.g., identifying a particular application, such as "Skype" or "WhatsApp"; or identifying an application-type, such as "video conferencing application" or "streaming audio application") (iii) to transfer said DPI-based result to said QoS Policy Enforcement Management Unit. Then, the QoS Policy Enforcement Management Unit utilizes (or takes into account, among other conditions or criteria) said DPI-based result for performing distributed QoS policy enforcement on said packet.

In some embodiments, a method may comprise: constructing a tree hierarchy representation that corresponds to distributed enforcement of a Quality-of-Service (QoS) policy on incoming packets that are intended for transmission towards a destination, said tree hierarchy representation utilized by at least two separate Processing Units (PUs) that separately process different packets that are intended for transmission towards said destination; generating an association between (I) a first set of instances of parent-child Policy Objects of QoS enforcement, and (II) a first PU; and generating a separate association between (i) a second set of instances of said parent-child Policy Objects of QoS enforcement, and (ii) a second PU; performing a cross-PU Instances Synchronization process, which automatically determines that the first PU caused modification of said first set of instances of said parent-child Policy Objects that are utilized by the first PU, and which dynamically causes a corresponding modification to said second set of instances of said parent-child Policy Objects that are utilized by the second PU; wherein the Cross-PU Instances Synchronization process is to dynamically synchronize, in real-time or in near-real-time, multiple instances of a Parent policy object of QoS enforcement that are associated separately with two or more PUs; wherein the Cross-PU Instances Synchronization process is to dynamically synchronize, in real-time or in near-real-time, multiple instances of a Child policy object of QoS enforcement that are associated separately with two or more PUs.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Although portions of the discussion herein relate, for demonstrative purposes, to wired links and/or wired communications, some embodiments are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C #, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may thus comprise any possible or suitable combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. A method comprising:

constructing a tree hierarchy representation that corresponds to distributed enforcement of a Quality-of-Service (QoS) policy on incoming packets that are intended for transmission towards a destination, said tree hierarchy representation utilized by at least two separate Processing Units (PUs) that separately process different packets that are intended for transmission towards said destination;

generating an association between (I) a first set of instances of parent-child Policy Objects of QoS enforcement, and (II) a first PU; and generating a separate association between (i) a second set of instances of said parent-child Policy Objects of QoS enforcement, and (ii) a second PU;

performing a cross-PU Instances Synchronization process, which automatically determines that the first PU caused modification of said first set of instances of said parent-child Policy Objects that are utilized by the first PU, and which dynamically causes a corresponding modification to said second set of instances of said parent-child Policy Objects that are utilized by the second PU;

wherein the Cross-PU Instances Synchronization process is to dynamically synchronize, in real-time or in near-real-time, multiple instances of a Parent policy object of QoS enforcement that are associated separately with two or more PUs;

wherein the Cross-PU Instances Synchronization process is to dynamically synchronize, in real-time or in near-real-time, multiple instances of a Child policy object of QoS enforcement that are associated separately with two or more PUs.

2. A non-transitory storage medium having stored thereon instructions that, when executed by a processor, cause the processor to perform a method comprising:

constructing a tree hierarchy representation that corresponds to distributed enforcement of a Quality-of-Service (QoS) policy on incoming packets that are intended for transmission towards a destination, said tree hierarchy representation utilized by at least two separate Processing Units (PUs) that separately process different packets that are intended for transmission towards said destination;

generating an association between (I) a first set of instances of parent-child Policy Objects of QoS enforcement, and (II) a first PU; and generating a separate association between (i) a second set of instances of said parent-child Policy Objects of QoS enforcement, and (ii) a second PU;

performing a cross-PU Instances Synchronization process, which automatically determines that the first PU caused modification of said first set of instances of said parent-child Policy Objects that are utilized by the first PU, and which dynamically causes a corresponding modification to said second set of instances of said parent-child Policy Objects that are utilized by the second PU;

wherein the Cross-PU Instances Synchronization process is to dynamically synchronize, in real-time or in near-real-time, multiple instances of a Parent policy object of QoS enforcement that are associated separately with two or more PUs;

wherein the Cross-PU Instances Synchronization process is to dynamically synchronize, in real-time or in near-real-time, multiple instances of a Child policy object of QoS enforcement that are associated separately with two or more PUs.

3. A system comprising:

one or more hardware processor to execute code, operably associated with one or more memory units to store code, wherein the one or more hardware processors are configured:

to construct a tree hierarchy representation that corresponds to distributed enforcement of a Quality-of-Service (QoS) policy on incoming packets that are intended for transmission towards a destination, said tree hierarchy representation utilized by at least two separate Processing Units (PUs) that separately process different packets that are intended for transmission towards said destination;

to generate an association between (I) a first set of instances of parent-child Policy Objects of QoS enforcement, and (II) a first PU; and to generate a separate association between (i) a second set of instances of said parent-child Policy Objects of QoS enforcement, and (ii) a second PU;

to perform a cross-PU Instances Synchronization process, which automatically determines that the first PU caused modification of said first set of instances of said parent-child Policy Objects that are utilized by the first PU, and which dynamically causes a corresponding modification to said second set of instances of said parent-child Policy Objects that are utilized by the second PU;

wherein the Cross-PU Instances Synchronization process is to dynamically synchronize, in real-time or in near-real-time, multiple instances of a Parent policy object of QoS enforcement that are associated separately with two or more PUs;

wherein the Cross-PU Instances Synchronization process is to dynamically synchronize, in real-time or in near-real-time, multiple instances of a Child policy object of QoS enforcement that are associated separately with two or more PUs.

* * * * *